US009255662B2

(12) United States Patent
Longo

(10) Patent No.: US 9,255,662 B2
(45) Date of Patent: Feb. 9, 2016

(54) MOBILE DEVICE MOUNT AND METHOD OF USING

(71) Applicant: Brett J. Longo, Valley Centter, CA (US)

(72) Inventor: Brett J. Longo, Valley Centter, CA (US)

( * ) Notice: Subject to any disclaimer, the term of this patent is extended or adjusted under 35 U.S.C. 154(b) by 0 days.

(21) Appl. No.: 14/010,528

(22) Filed: Aug. 27, 2013

(65) Prior Publication Data

US 2014/0054343 A1    Feb. 27, 2014

Related U.S. Application Data

(60) Provisional application No. 61/693,425, filed on Aug. 27, 2012.

(51) Int. Cl.
*F16M 11/14* (2006.01)
*F16M 13/02* (2006.01)
*F16M 11/04* (2006.01)
*F16M 13/00* (2006.01)

(52) U.S. Cl.
CPC ........... *F16M 13/022* (2013.01); *F16M 11/041* (2013.01); *F16M 11/14* (2013.01); *F16M 13/00* (2013.01)

(58) Field of Classification Search
CPC . F16M 11/14; F16M 11/041; F16M 220/022; F16C 11/106
USPC ......................... 224/559; 403/90, 76, 122, 94; 248/181.1, 288.31, 288.51
See application file for complete search history.

(56) References Cited

U.S. PATENT DOCUMENTS

| 5,619,395 | A | 4/1997 | McBride |
| D426,235 | S | 6/2000 | Andresen et al. |
| 8,116,832 | B2 | 2/2012 | Chai et al. |
| 8,340,721 | B2 | 12/2012 | Moran et al. |
| 8,376,292 | B2 | 2/2013 | Cicco |
| 8,894,316 | B2 * | 11/2014 | Kallas et al. .................... 403/90 |
| 2007/0138358 | A1 * | 6/2007 | Chang ........................ 248/205.5 |
| 2013/0020363 | A1 | 1/2013 | Fraser |

FOREIGN PATENT DOCUMENTS

EP     2311688 B2     4/2013

OTHER PUBLICATIONS

Cyngett Dashview Universal Product Instructions (2011), 3 pages.

* cited by examiner

*Primary Examiner* — Brian D Nash
*Assistant Examiner* — Corey Skurdal
(74) *Attorney, Agent, or Firm* — Noon Intellectual Property Law, P.C.

(57) ABSTRACT

This application relates to a mobile device mount and method of using the mount. In some embodiments, a mobile electronic device mount includes: a base configured to secure a first mobile electronic device to a second item; a body configured to receive and retain the first mobile electronic device; and a connector configured to connect the base to the body, wherein the connector includes a rotational component that allows the base and body to move from up to 360 degrees relative to each other in a first plane and move at least 170 degrees relative to each other in a second plane.

17 Claims, 6 Drawing Sheets

MOBILE DEVICE MOUNT AND METHOD OF USING

CROSS-REFERENCE TO RELATED APPLICATIONS

This application claims the benefit of priority to U.S. Application No. 61/693,425, filed Aug. 27, 2012, which is hereby incorporated by reference in its entirety.

FIELD

The present application relates, in some embodiments, to personal electronic devices, and in particular, to personal electronic device holders or mounts.

BACKGROUND

In recent years, hand-held portable electronic devices (e.g., cell phones, global positioning system (GPS) units, portable game consoles, personal digital assistants (PDAs), tablets, external hard drives, etc.) have become increasingly popular. For example, twenty years ago cell phones were used by business executives to track meetings and stock market performance. Now it is common for every member of a family to have their own cell phone with children as young as 8 or 9 carrying them to school. Moreover, the technology of the portable electronic device has blended. No longer is a cell phone just a cell phone, a PDA just a PDA or a portable hand held game console just for playing personal video games. The technologies are intertwined and a user can now use his "cell phone" to make a phone call, upload pictures, play a video game, track his location using built in GPS technology, surf the internet, and much more. The use of the mobile electronic device has become such a part of personal daily use that it is common for an individual to suffer anxiety if he realizes too late that he has left home and forgotten his cell phone.

An advantage of hand-held mobile electronic devices is their size and portability. This, however, can also make them difficult to find if the user has set them down. Much like forgetting where the car keys are, the remote control to the television or forgetting where the wallet and check book are, it can be a challenge to always remember the location of the hand-held personal electronic device.

Users of mobile electronic devices are discovering that mounting devices are very beneficial because they make it easier and more convenient to view the mobile electronic device. For example, there have been a variety of mobile electronic mount devices that allow one to mount a mobile electronic device such as a cellular phone to the windshield or dashboard of a vehicle. Many such mounting devices include a base with a suction device that firmly mounts the mobile electronic device to the windshield or dashboard of the vehicle, a cradle for holding or securing the mobile electronic device, and an arm that extends from the base to the cradle. The mounting devices generally allow for adjusting of the base in orientation to the cradle, however, this orientation has been historically limited to about 50 to 100 degrees extension or less.

With the blending of technology and the increased reliance on mobile electronic devices, it would be desirable to have a mobile device mount that could be used to mount mobile electronic devices in a variety of locations, not just in vehicles. For example, a mounting device that could operate interchangeably to mount a mobile electronic device to a laptop or other portable electronic device in addition to a vehicle would be quite useful. Such a mount would also make it easier for a user to locate the mobile electronic device if the user gets used to keeping his device in the mount. Other benefits may include not having to remove the device from the mount every time a user leaves his car; instead he can detach the mount from the car, bring it with him and stand it up next to his computer, on his night stand, etc.

SUMMARY

Some embodiments disclosed herein relate to a mobile device mount.

In some embodiments, a mobile electronic device mount includes: a base configured to secure a first mobile electronic device to a second item; a body configured to receive and retain the first mobile electronic device; and a connector configured to connect the base to the body, wherein the connector includes a rotational component that allows the base and body to move up to 360 degrees relative to each other in a first plane and move at least 170 degrees relative to each other in a second plane.

In some embodiments, a method of using a mobile electronic device mount includes: placing a mobile electronic device in the mount; mounting the mount to a desired location; adjusting the mount in a first plane up to 360 degrees; and adjusting the mount in a second plane at least 170 degrees.

BRIEF DESCRIPTION OF THE DRAWINGS

Embodiments of present application will become more fully understood from the detailed description and the accompanying drawings, which are not intended to limit the scope of the present application.

DETAILED DESCRIPTION

After reading this description it will become apparent to one skilled in the art how to implement the various embodiments and alternative applications described herein. It is understood that the embodiments presented here are presented by way of an example only, and not limitation. As such, this detailed description of various alternative embodiments should not be construed to limit the scope or breadth of the present application as set forth below.

Figure 1:
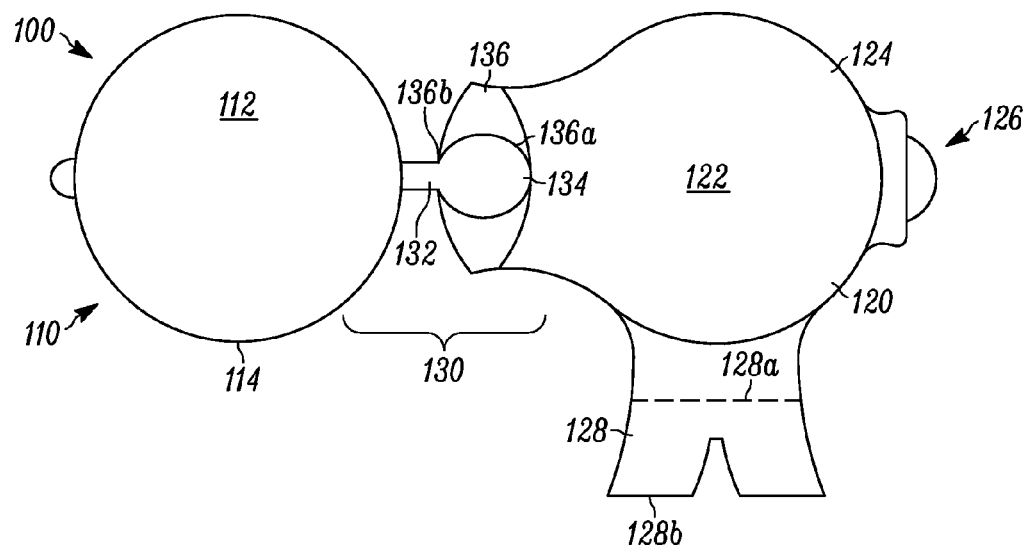
FIG. 1 illustrates a rear perspective view of a first example mobile device mount in accordance with embodiments of the present disclosure.

FIG. 1 illustrates a rear perspective view of a mobile device mount in accordance with embodiments of the present disclosure. Mobile device mount 100 includes three components: a body portion 110, a base portion 120, and a connector or joint portion 130. As shown, body portion 110 is round, but may take any shape. Also, while not depicted in FIG. 1, body portion 110 may include a textured profile or edge as desired.

Body portion 110 is configured to connect or attach mobile device mount 100 to a secondary item. For example, in some embodiments, the secondary item may include a vehicle windshield, a vehicle dashboard, a laptop surface, a monitor surface, a tablet surface, etc. The type of secondary item may be any item a user desires, provided the body portion 110 includes suitable structure to adhere or fasten the mobile device mount 100 to the secondary item, as will become apparent in the various embodiments described herein (e.g., a smooth surface suitable for mounting with a suction cup).

In some embodiments, body portion 110 is constructed from a polymer or polymer composite 112. In other embodiments, body portion 110 is constructed from a metal or metal alloy such as a brushed aluminum to provide a more aesthetically pleasing and lightweight device 100. In still other embodiments, body portion 110 is constructed from a plurality of material types including metals, polymers, ceramics, etc.

Base portion 120 includes a plurality of sections viewable in FIG. 1. For example, base portion 120 includes a main base portion 124, a receiving portion 126, and a seat portion 128. In some embodiments, receiving portion 126 and/or seat portion 128 are located on the front side of base portion 120, which will be more apparent and described in subsequent figures. In some embodiments, seat portion 128 may be a blunt, short design such as shown by 128a. In other embodiments, seat portion 128 may be a longer stand extension such as shown by 128b. The design and length of seat portion 128 may comprise different configurations based on user requirements. For example, in some embodiments, a longer stand extension 128b is desired, allowing a user to have mount 100 stand at a certain height which helps aid in stability for mount 100 (see FIG. 5). In some embodiments, stand extension 128b aids in maintaining the structural integrity of mount 100 by grounding it to the surface it is placed upon, rather than, e.g., hanging out the side of a computer in jeopardy of being hit.

Similar to body portion 110, in some embodiments, base portion 120 is constructed from a polymer or polymer composite 122. However, any suitable material type or types may be used to make base portion 120.

Base portion 120 is configured to receive and secure a mobile device (not shown). In some embodiments, base portion 120 includes various receiving mechanisms, which are shown in subsequent figures.

Connector or joint portion 130 includes an arm 132, a ball 134, and a socket or receiving portion 136. Receiving portion 136 includes a main receptive portion 136a and a groove or slot 136b. In some embodiments, arm 132 and ball 134 are in communication or connected to body portion 110. Similarly, receiving portion 136 is in communication with or connected to base portion 120.

As shown, receiving portion 136 is configured to receive ball 134 such that ball 134 can move within the main receptive portion 136a when a predetermined amount of force is applied to connector 130 via a user adjusting the base portion 120 or body portion 110. In some embodiments, the predetermined force is greater than a vibrational force typically received from driving in a vehicle (e.g., when mount 100 is used to secure a mobile device to a vehicle) or greater than from simple repetitive motion such as opening and closing a laptop (e.g., when mount 100 is used to secure a mobile device to a laptop).

As shown, groove 136b is configured to receive arm 132 when arm 132 is perfectly aligned to fit into groove 136b. When arm 132 is so aligned, arm 132 can move within groove 136b when a predetermined amount of force is applied to connector 130 via a user adjusting the base portion 120 or body portion 110. This predetermined force is substantially similar to that described above with respect to the ball 134 and main receptive portion 136a.

In some embodiments, connector 130 may include a lubricant to ensure that ball 134 and arm 132 operate effectively within main receptive portion 136a and groove 136b, respectively. Such lubricates depend on the fabrication materials used for mount 100.

It should be appreciated that ball 134 will be received in main receptive portion 136a at all times mount 100 is in use. Ball 134 may freely rotate about at least one axis while within main receptive portion 136a, e.g., movement from 0 to 360 degrees can be achieved. In some embodiments, ball 134 can freely rotate about an axis generally parallel with the direction that arm 132 extends between body portion 110 and base portion 120 (e.g., an axis extending from left to right in FIG. 1).

In contrast, arm 132 is only received within groove 136b when aligned. Arm 132 may be rotated within groove 136b at least 170 degrees (e.g., at least 180 degrees, at least 190 degrees, at least 200 degrees, or at least 250 degrees) about an axis perpendicular the direction that arm 132 extends between body portion 110 and base portion 120 (e.g., an axis extending from top to bottom in FIG. 1). In some embodiments, arm 132 may be rotated within groove 136b less than 360 degree (e.g., less than 315 degrees, less than 270 degrees, less than 225 degrees, or less than 200 degrees). In some embodiments, ball 134 does not freely rotate about at any axis when arm 132 is within groove 136b. In some embodiments, ball 134 cannot freely rotate about an axis generally parallel with the direction that arm 132 extends between body portion 110 and base portion 120 when arm 132 is within groove 136b (e.g., ball 134 can be rotated less than 360 degrees, or less than 270 degrees, or less than 180 degrees).

The dimensions for all described connector components may vary. For example, arm 132 can be 1.25 cm long and 0.5 cm in cylindrical diameter. Ball 134 can be 1.75 cm in diameter. Main receptive portion 136a has a cutout 136aa that is 0.5 cm wide and 1.25 cm long, which exposes ball 134. Groove 136b can begin at an edge of cutout 136aa and can extend 1.25 cm and is 0.5 cm wide for receiving arm 132.

Figure 2:
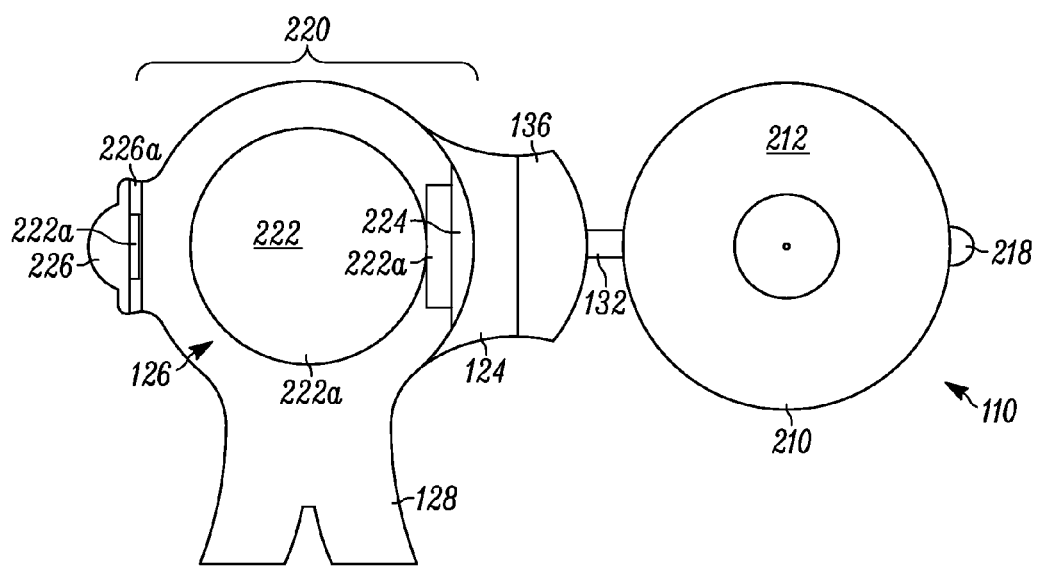
FIG. 2 illustrates a front perspective view of the mobile device mount of FIG. 1 in accordance with embodiments of the present disclosure.

FIG. 2 illustrates a front perspective view of the mobile device mount of FIG. 1 in accordance with embodiments of the present disclosure. As shown, body portion 110 includes a securing mechanism 210 for adhering or securing body portion 110 to a secondary item. Mechanism 210 may comprise a suctioning means such as a suction cup 212. The operation of a suction cup 212 is known to one or ordinary skill in the art, and may be actuated such as through a rotary wheel 214 that causes a backing edge 320 to pull against the back of the suction cup, causing it to adhere to whatever substantially flat surface it is placed against. For example, rotary wheel 214 may include a texture profile or edge, which allows a user to cause the suction cup 212 to engage. Additionally, suction cup 212 may include a tab 218 that allows a user to disengage the suction cup 212 when in use.

Figure 8:
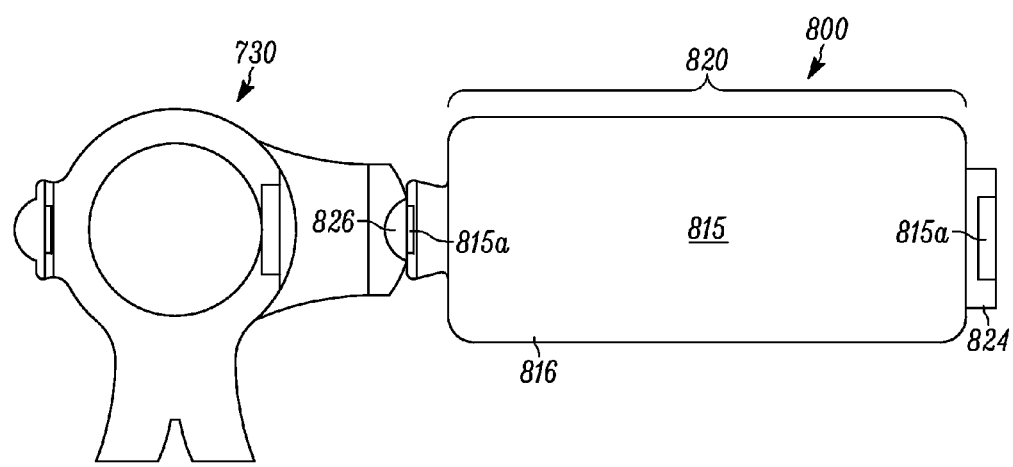
FIG. 8 illustrates a front perspective view of a third example mobile device mount in accordance with embodiments of the present disclosure.
Figure 9:
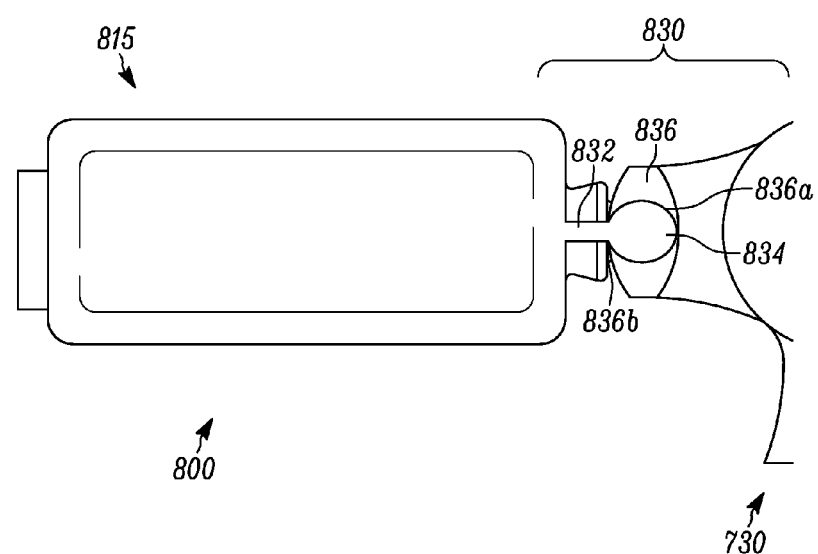
FIG. 9 illustrates a rear perspective view of the mobile device mount of FIG. 8 in accordance with embodiments of the present disclosure.
Figure 10:
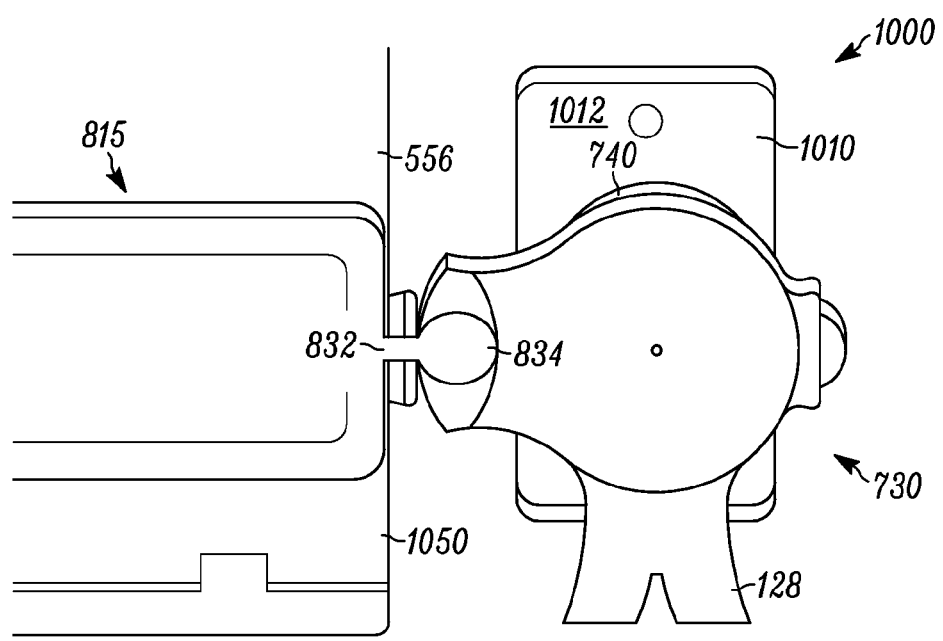
FIG. 10 illustrates a rear view of the mobile device mount of FIG. 8 in use with a laptop in accordance with embodiments of the present disclosure.

While a suction means such as suction cup 212 is shown for adhering body portion 110 to a secondary item, any suitable adherence mechanism may be used. For example, a second clamping or cradle mechanism (as shown in FIGS. 8, 9 and 10) could be used. As another example, a pressure-sensitive adhesive may be used.

Also as shown in FIG. 2, base portion 120 includes a base main base portion 124, a receiving portion 126, and a seat portion 128. Receiving portion 126 may include a cradle portion 220 for receiving and securing a mobile device. In some embodiments, main base portion 124 and receiving portion 126 are separate components secured to one another via a securement means. For example, the securement means may include a pin and ratchet system, which allow main base portion 124 and receiving portion 126 to move relative to each other in a controlled (e.g., ratcheted) manner, allowing receiving portion 126 to rotate 360 degrees. In some embodiments, receiving portion 126 detaches from main base portion 124 to allow main base portion 124 to be used on either side of e.g., a computer screen, with a right arm 226 extending away from body portion 110.

In some embodiments, cradle portion 220 includes back 222 and a left arm 224 and right arm 226. Back 222 may include one or more textured materials 222a on its surface to protect and/or provide additional gripping and/or to mold to the contour of an edge of a received mobile device. Left arm 224 and/or right arm 226 may also include one or more textured materials (not shown) on their surfaces to protect and/or provide additional gripping to a received mobile device. In some embodiments, the textured materials on back 222 and arms 224, 226 will be similar, and in other embodiments, the textured materials on back 222 and arms 224, 226 will be different. Suitable textured materials may include, for example, polymers, aluminum, ceramics, etc. The textured materials may include any type of stenciling or pattern known to one of skill in the art. The thicknesses of the textured materials may vary, but will generally be between about 0.5 to 5 mm, and more particularly between about 2.0 to 3.0 mm.

In some embodiments, either left arm 224, right arm 226 and/or both left arm 224 and right arm 226 are adjustable (e.g., extendible). For example, as shown, right arm 226 includes a right wall 226a that is adjustable In operation, a user can pull right wall 226a away from back 222 and right wall 226a will extend out, making the cradle portion 220 wider (e.g., for receiving larger devices). Right wall 226a may extend out as is known to those of skill in the art. For example, right wall 226a may be connected to receiving portion 126 via a spring-loaded tensioned wall arm (not shown) that when in rest causes right wall 226a to be pressed up against receiving portion 126. However, when right wall 226a is pulled away from back 222, the spring-loaded tensioned wall arm will become exposed and visible to a user.

As shown, left arm 224 is stationary, and not extendible. As stated above, in other embodiments, left arm 224 includes a left wall (not shown) that is adjustable. Adjustable left wall will operate in substantially the same manner as adjustable right wall.

In some embodiments, having a single adjustable arm 226 may allow for the cradle portion 220 to extend an additional 0 to 10 cm, and more particularly 2 to 5 cm. Similarly, having a two adjustable arms 224, 226 may allow for the cradle portion 220 to extend an additional 0 to 20 cm, and more particularly 4 to 10 cm. In general, when cradle portion 220 is not extended, the cradle is between about 5 and 6.5 cm wide to accommodate standard mobile electronic devices. However, it should be appreciated that cradle portion 220 can be made any size to accommodate desired mobile electronic devices.

Figure 3A:
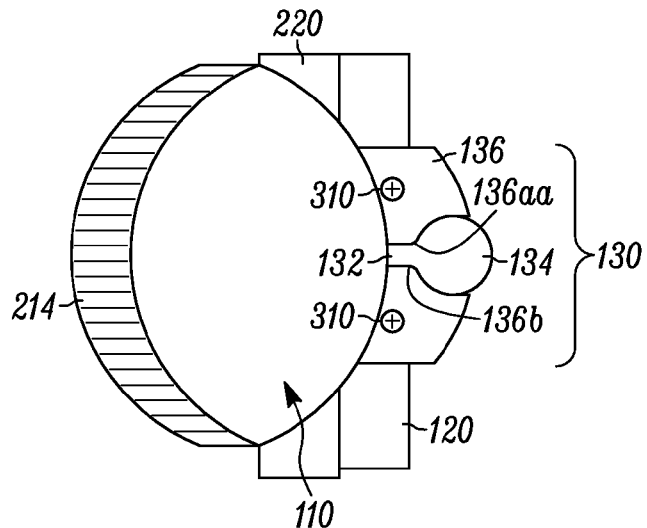
FIGS. 3A, 3B, and 3C illustrate rotated views of the mobile device mount of FIG. 1 in accordance with embodiments of the present disclosure.
Figure 3C:
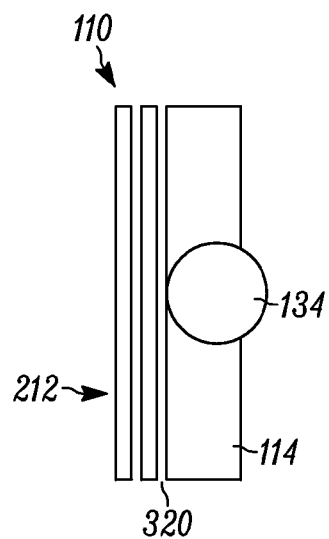
Figure 3B:
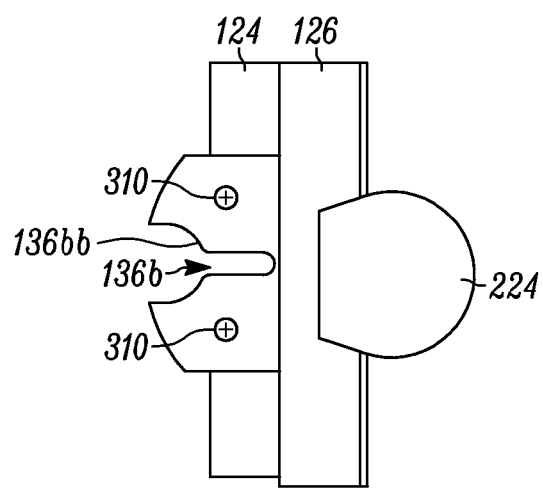

FIGS. 3A, 3B, and 3C illustrate rotated views of the mobile device mount of FIG. 1 in accordance with embodiments of the present disclosure. For example, FIG. 3A illustrates body 110 bent at an angle from base 120, showing the ability of base 120 to rotate about an axis beyond 180 degrees. As shown, connector or joint portion 130 may be fabricated using a formed piece of plastic or aluminum. Receiving portion 136 may be connected to base 120 by a plurality of fasteners 310. As shown, fasteners 310 are two screws; however any type of suitable fasteners and any number of fasteners may be used.

FIG. 3A also illustrates how groove 136b allows arm 132 to extend body 110 beyond 170 degrees (e.g., up to about 200 degrees or more). For example, as shown in FIG. 3B, groove 136b maybe notched 136bb, allowing arm 132 to click into place, so that when a mobile electronic device is angled to a user's discretion, it remains in place at a suitable angle for viewing.

FIG. 3C illustrates that ball 134 protrudes out from base 110 (via arm 132). Ball 134 fits firmly into main receptive portion 136a and can be oriented in any direction (e.g., up to about 360 degrees or more) the user desires. As shown, base 110 includes a securing mechanism 210, such as a suction cup 212 or rubber film that, when connected to a surface e.g., the back of a computer screen, securely fastens the base 110 to the back of the computer screen (see FIGS. 5 and 6).

Figure 4:
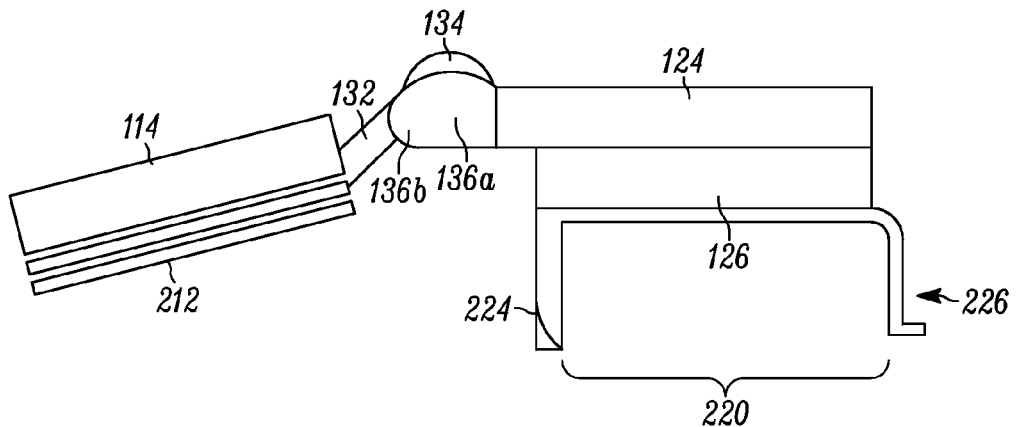
FIG. 4 illustrates a top angled view of the mobile device mount of FIG. 1 in accordance with embodiments of the present disclosure.

FIG. 4 illustrates a top angled view of the mobile device mount of FIG. 1 in accordance with embodiments of the present disclosure. As shown in FIG. 4, the way in which a user may move a mobile electronic device with respect to body 110 is easily appreciated. In operation, a user simply needs to place his mobile electronic device face up in cradle portion 220, by adjusting right arm 226 if necessary or desired. Once in the mobile electronic device is secured in cradle portion, the user can adjust the body 110 as desired by rotating ball 134 and/or by moving arm into a desired angle within groove 136b. Thereafter (or before adjusting to the desired angle), the user can attach the body to a second item using securing mechanism 210, such as suction cup 212.

Figure 5:
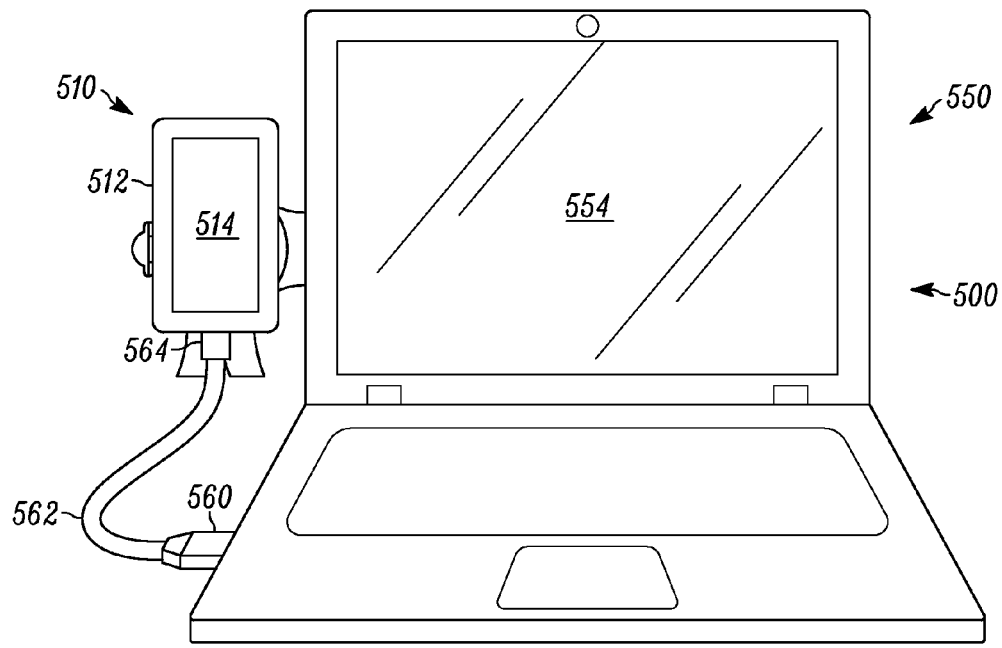
FIG. 5 illustrates a front view of the mobile device mount of FIG. 1 in use with a laptop in accordance with embodiments of the present disclosure.
Figure 6:
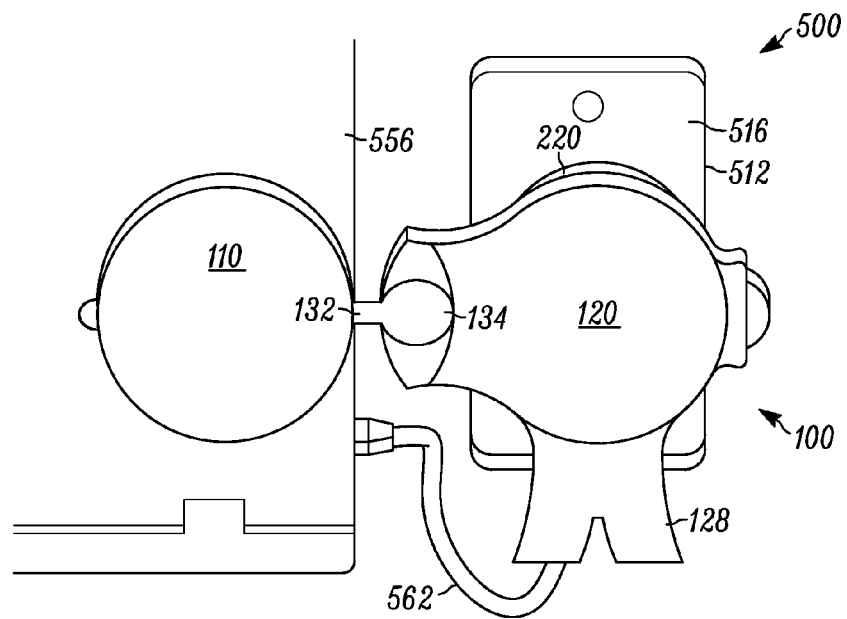
FIG. 6 illustrates a rear view of the mobile device mount of FIG. 1 in use with a laptop in accordance with embodiments of the present disclosure.

FIG. 5 illustrates a front view of the mobile device mount of FIG. 1 in use with a laptop in accordance with embodiments of the present disclosure. FIG. 6 illustrates a rear view of the mobile device mount of FIG. 1 in use with a laptop in accordance with embodiments of the present disclosure.

In FIG. 5, a system 500 including a mobile electronic device 510 connected to a laptop computer 550 is provided. As shown, mobile electronic device is a cellular or mobile phone 512. Mobile phone 512 includes a screen 514 that can easily be seen and operated while viewing and operating laptop computer screen 554. Also shown is an optional tethered line (e.g., a universal serial bus (USB) cord) 562 that extends from the power port 564 of phone 512 and is plugged into a USB port 560 of laptop 550.

FIG. 6, system 500 is shown from a rear perspective. This can be appreciated from viewing backside 516 of phone 512 and backside 556 of laptop screen 554. FIG. 6 shows mobile phone 512 connected to cradle portion 220 of base portion 120. Also shown are ball 134 and arm 132 engaged in main receptive portion 136a and a groove 136b, respectively. Body portion 110 is firmly connected or attached to the backside 516 of laptop screen 554 using suction cup 212. Mount 100 can be mounted to any flat portion of laptop 550. It should be appreciated that mount 100 can also be mounted to the back of any flat panel computer screen, tablet, or any other device that has a suitable surface.

Figure 7:
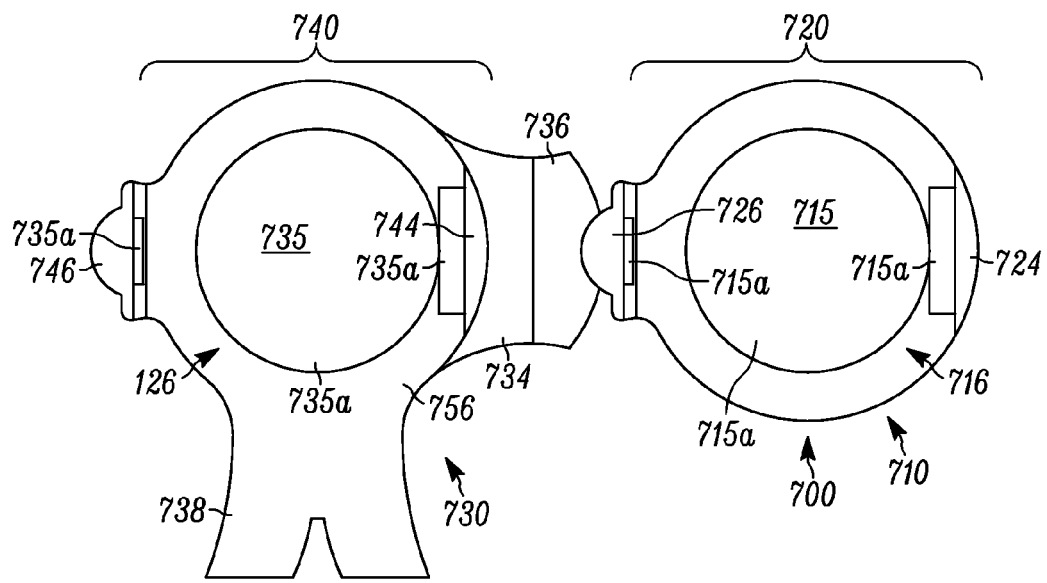
FIG. 7 illustrates a front perspective view of a second example mobile device mount in accordance with embodiments of the present disclosure.

FIG. 7 illustrates a front view of a second example mobile device mount in use in accordance with embodiments of the present disclosure. In FIG. 7, mobile device mount 700 includes three components: a body portion 710, a base portion 730, and a connector or joint portion (partially shown via a receiving portion 736). From viewing FIG. 7, it should be apparent that body portion 710 and base portion 730 are similar, with both body portion 710 and base portion 730 being configured to receive and secure a mobile device. For example, body portion 710 may receive and secure a first mobile device such as a tablet and base portion 730 may receive and secure a second mobile device such as a mobile phone. In such an example, seat portion 738 may allow for the two mobile devices to have a similar height when propped up.

Still referring to FIG. 7, body portion 710 includes main base portion (not shown) and receiving portion 716. Receiving portion 716 may include a cradle portion 720 for receiving and securing a mobile device. In some embodiments, main base portion (not shown) and receiving portion 716 are separate components secured to one another via a securement means. For example, the securement means may include a pin and ratchet system, which allow main base portion (not shown) and receiving portion 716 to move relative to each other in a controlled (e.g., ratcheted) manner, allowing receiving portion 716 to rotate 360 degrees.

In some embodiments, cradle portion 720 includes back 715 and a left arm 724 and a right arm 726. Back 715 may include one or more textured materials 715a on its surface to protect and/or provide additional gripping to a received mobile device. Left arm 724 and/or right arm 726 may also include one or more textured materials on their surfaces to protect and/or provide additional gripping to a received mobile device.

In some embodiments, either left arm 724, right arm 726 and/or both left arm 724 and right arm 726 are adjustable (e.g., extendible).

Base portion 730 includes a base main base portion 734, a receiving portion 756, and a seat portion 738. Receiving portion 756 may include a cradle portion 740 for receiving and securing a mobile device. In some embodiments, main base portion 734 and receiving portion 756 are separate components secured to one another via a securement means. For example, the securement means may include a pin and ratchet system, which allow main base portion 734 and receiving portion 756 to move relative to each other in a controlled (e.g., ratcheted) manner, allowing receiving portion 756 to rotate 360 degrees.

In some embodiments, cradle portion 740 includes back 735 and a left arm 744 and a right arm 746. Back 735 may include one or more textured materials 735a on its surface to protect and/or provide additional gripping to a received mobile device. Left arm 744 and/or right arm 746 may also include one or more textured materials (not shown) on their surfaces to protect and/or provide additional gripping to a received mobile device.

In some embodiments, either left arm 744, right arm 746 and/or both left arm 744 and right arm 746 are adjustable (e.g., extendible).

While not shown in full detail, body portion 710 and base portion 730 are connected via a joint or connector 130, as shown in FIGS. 1-6. For example base portion 730 is in communication with or connected to a receiving portion 736, which may be analogous to socket or receiving portion 136. Thus, while an arm and ball are not visible in FIG. 7, receiving portion 736 operates to receive an arm and ball (such as arm 132 and ball 134 that are clearly described in reference to FIGS. 1-6). Consequently, it should be appreciated that the arm and ball are in communication with or connected to body portion 710 and are not visible because of right arm 726 blocking them from the front view.

FIG. 8 illustrates a front perspective view of a third example mobile device mount in accordance with embodiments of the present disclosure. In FIG. 8, mobile device mount 800 includes three components: a body portion 815, a base portion 730, and a connector or joint portion 830 (see FIG. 9). From viewing FIG. 8, it should be apparent that body portion 815 is similar to body portion 710 of FIG. 7, except body portion 815 is rectangular in shape instead of round. Body portion 815 includes similar features including a receiving portion 816, a right arm 826 and a left arm 824, which make up a cradle portion 820 for receiving and securing a mobile device. Body portion 815 and right arm 826 and/or left arm 824 may optionally include one or more textured materials 815a on their surfaces. In some embodiments, either left arm 824, right arm 826 and/or both left arm 824 and right arm 826 are adjustable (e.g., extendible).

FIG. 9 illustrates a rear perspective view of the mobile device mount of FIG. 8 in accordance with embodiments of the present disclosure. As shown in FIG. 9, mount 800 includes a joint or connector 830. Connector or joint portion 830 includes an arm 832, a ball 834, and a socket or receiving portion 836. Receiving portion 836 includes a main receptive portion 836a and a groove 836b. In some embodiments, arm 832 and ball 834 are in communication or connected to body portion 815. Similarly, receiving portion 836 is in communication with or connected to base portion 730. Joint or connector 830 operates similarly to joint or connector 130 of FIGS. 1-6, and so will not be discussed in further detail.

FIG. 10 illustrates a rear view of the mobile device mount of FIG. 8 in use with a laptop in accordance with embodiments of the present disclosure. In FIG. 10, a system 1000 including a mobile electronic device 1010 connected to a laptop computer 1050 is provided. FIG. 10 shows mobile phone 1012 connected to cradle portion 740 of base portion 730. Also shown are ball 834 and arm 832 engaged in main receptive portion 836a and a groove 836b, respectively. Body portion 8150 is firmly connected or attached to the backside of the laptop 1050 screen using cradle portion 820. Mount 800 can be mounted to/around the edges of any flat portion of laptop 1050. It should be appreciated that mount 800 can also be mounted to the back of any flat panel computer screen, tablet, or any other device that has a flat surface and to which the cradle 820 may encompass.

The above description of disclosed embodiments is provided to enable any person skilled in the art to make or use described embodiments. Various modifications to the embodiments will be readily apparent to those skilled in the art; the generic principals defined herein can be applied to other embodiments without departing from spirit or scope of the application. Thus, the application is not intended to be limited to the embodiments shown herein but is to be accorded the widest scope consistent with the principals and novel features disclosed herein.

What is claimed is:

1. A mobile electronic device mount comprising:
   a base configured to secure a first mobile electronic device to a second item;
   a body configured to receive and retain the first mobile electronic device; and
   a connector configured to connect the base to the body, wherein the connector includes a ball, an arm, and a receiving portion, the arm and ball contiguous with each other, the receiving portion having a cutout exposing the ball when the ball is engaged in the receiving portion and the receiving portion having a notched groove for receiving the arm when aligned to lock the arm into a fixed position, wherein the ball allows the base and body to move at least 360 degrees relative to each other in a first plane and move at least 180 degrees and less than 360 degrees relative to each other in a second plane, wherein the first plane and the second plane are orthogonal.

2. The mount of claim 1, wherein the ball allows the base and body to move up to 200 degrees relative to each other in the second plane.

3. The mount of claim 1, wherein the ball is configured to be received in the receiving portion.

4. The mount of claim 3, wherein the ball is matingly received in the receiving portion such that the ball will move within the receiving portion when a predetermined amount of force is applied to the connector via a user adjusting the base or body, the predetermined force comprising an intentional force greater than a vibrational force or repetitive motion.

5. The mount of claim 4, wherein the second item comprise an electronic surface and the predetermined force is greater than vibrational force associated with having the mount connected to the electronic surface.

6. The mount of claim 4, wherein the ball in the receiving portion can move up to 360 degrees.

7. The mount of claim 1, wherein the arm is matingly received in the groove such that the arm will move within the groove when a predetermined amount of force is applied to the connector via a user adjusting the base or body.

8. The mount of claim 7, wherein the predetermined force is greater than vibrational force received from the second item.

9. The mount of claim 7, wherein the arm in the groove can move at least 170 degrees.

10. The mount of claim 1, wherein the second item is selected from the group comprising vehicle windshield, vehicle dashboard, vehicle mirror, vehicle console, computer monitor, laptop, tablet, mobile phone, personal digital assistant, global positioning system unit, portable gaming device, external hard drive, and credit card capturing unit.

11. The mount of claim 1, wherein the base comprises: a main base portion in communication with the connector, and a receiving portion comprising a cradle for receiving the mobile device.

12. The mount of claim 1, wherein the body comprises: a securing mechanism comprising a suction cup in communication with a rotary wheel for actuating the suction cup.

13. The mount of claim 1, wherein the base further comprises a stand extension configured to allow the mount to stand alone when not attached to the second item.

14. The mount of claim 1, wherein the mount is fabricated from vinyl, aluminum, and/or rubber.

15. The mount of claim 1, wherein the body comprises a second base and wherein the second base is configured to received and retain a second mobile electronic device.

16. A method of using a mobile electronic device mount, the method comprising:
  placing a mobile electronic device in the mount, the mount comprising: a base configured to secure the mobile electronic device to a second item, a body configured to receive and retain the mobile electronic device, and a connector configured to connect the base to the body, wherein the connector includes a ball, an arm, and a receiving portion, the arm and ball contiguous with each other, the receiving portion having a cutout exposing the ball when the ball is engaged in the receiving portion and the receiving portion having a notched groove for receiving the arm when aligned to lock the arm into a fixed position;
  mounting the mount to a desired location;
  adjusting the mount in a first plane up to 360 degrees; and
  adjusting the mount in a second plane at least 180 degrees and less than 360 degrees, wherein the first plane and the second plane are orthogonal.

17. The method of claim 16, further comprising: clicking the mount into place upon adjusting the mount in the second plane.

* * * * *